United States Patent
Wallman

(10) Patent No.: US 10,110,448 B2
(45) Date of Patent: *Oct. 23, 2018

(54) AUTOMATIC SETUP OF REFLECTOR INSTANCES

(71) Applicant: Accedian Networks Inc., Saint-Laurent (CA)

(72) Inventor: Anders Wallman, Handen (SE)

(73) Assignee: Accedian Networks Inc., Saint-Laurent (CA)

( * ) Notice: Subject to any disclaimer, the term of this patent is extended or adjusted under 35 U.S.C. 154(b) by 0 days.

This patent is subject to a terminal disclaimer.

(21) Appl. No.: 15/212,420

(22) Filed: Jul. 18, 2016

(65) Prior Publication Data

US 2016/0330092 A1   Nov. 10, 2016

Related U.S. Application Data

(63) Continuation of application No. 14/856,675, filed on Sep. 17, 2015, now Pat. No. 9,419,883, which is a
(Continued)

(51) Int. Cl.
*H04L 12/26* (2006.01)
*H04L 29/06* (2006.01)

(52) U.S. Cl.
CPC .......... *H04L 43/06* (2013.01); *H04L 43/0858* (2013.01); *H04L 43/0864* (2013.01);
(Continued)

(58) Field of Classification Search
CPC . H04L 43/06; H04L 43/0858; H04L 43/0864; H04L 43/10; H04L 43/106;
(Continued)

(56) References Cited

U.S. PATENT DOCUMENTS 6,865,602 B1   3/2005   Nijemcevic et al.
6,937,594 B2   8/2005   Smith et al.
(Continued)

FOREIGN PATENT DOCUMENTS

EP   1734690   12/2006

OTHER PUBLICATIONS

Cisco IP SLA Probe User's Guide, Feb. 7, 2007, (5 pages).
(Continued)

*Primary Examiner* — Duc C Ho
(74) *Attorney, Agent, or Firm* — Stratford Managers Corporation

(57) ABSTRACT

A method of establishing a service operations administration and maintenance (OAM) session between an originator and a reflector in a communication network includes continuously monitoring, by the reflector, any test packets transmitted by the originator. The originator transmits to the reflector, at a time indicated by a first timestamp, a test packet. The reflector receives the test packet at a time indicated by a second timestamp and generates a unique flow identifier that identifies the reflector. The reflector transmits the test packet to the originator. The reflector assigns a sequence number to the test packet. The originator receives the test packet at a time indicated by a fourth timestamp. The reflector stores the unique flow identifier at least for the duration of the OAM session.

7 Claims, 6 Drawing Sheets

Related U.S. Application Data continuation of application No. 14/551,234, filed on Nov. 24, 2014, now Pat. No. 9,166,900, which is a continuation of application No. 14/184,898, filed on Feb. 20, 2014, now Pat. No. 8,923,132, which is a continuation of application No. 13/557,138, filed on Jul. 24, 2012, now Pat. No. 8,711,708.

(52) U.S. Cl.
CPC ............ *H04L 43/10* (2013.01); *H04L 43/106* (2013.01); *H04L 43/18* (2013.01); *H04L 43/50* (2013.01); *H04L 69/22* (2013.01); *H04L 69/16* (2013.01)

(58) Field of Classification Search
CPC ......... H04L 43/18; H04L 43/50; H04L 69/22; H04L 69/16
See application file for complete search history.

(56) References Cited

U.S. PATENT DOCUMENTS

| | | | |
|---|---|---|---|
| 8,064,356 B1* | 11/2011 | Krzanowski | ............ H04L 41/04 370/249 |
| 8,923,132 B2 | 12/2014 | Wallman | |
| 2003/0016627 A1* | 1/2003 | MeLampy | ........ H04L 29/06027 370/235 |
| 2005/0099949 A1 | 5/2005 | Mohan | |
| 2005/0099954 A1 | 5/2005 | Mohan et al. | |
| 2005/0243731 A1 | 11/2005 | Smith et al. | |
| 2006/0285501 A1 | 12/2006 | Damm | |
| 2007/0274227 A1 | 11/2007 | Rauscher et al. | |
| 2008/0273467 A1 | 11/2008 | Zhang et al. | |
| 2009/0037713 A1 | 2/2009 | Khalid et al. | |
| 2009/0175274 A1 | 7/2009 | Aggarwal et al. | |
| 2010/0246583 A1* | 9/2010 | Morinaga | ........... H04L 41/0631 370/392 |
| 2011/0029687 A1 | 2/2011 | Kirrmann et al. | |
| 2011/0176416 A1 | 7/2011 | Bhatti et al. | |
| 2011/0222412 A1 | 9/2011 | Kompella | |
| 2012/0063345 A1 | 3/2012 | Krzanowski et al. | |
| 2012/0128000 A1* | 5/2012 | Baillargeon | ............ H04L 43/10 370/392 |
| 2012/0170465 A1* | 7/2012 | Spieser | ............... H04L 12/2697 370/249 |
| 2013/0010607 A1 | 1/2013 | Kini et al. | |
| 2013/0028105 A1* | 1/2013 | Chew | ..................... H04L 43/12 370/252 |
| 2013/0044604 A1 | 2/2013 | Hatley | |
| 2013/0088977 A1 | 4/2013 | Baillargeon | |
| 2013/0121164 A1 | 5/2013 | Shabtay | |

OTHER PUBLICATIONS

Extended European Search Report dated Nov. 12, 2013 which issued in European Patent Application No. 13177793.0, (11 pages).
Extended European Search Report dated Nov. 15, 2013 which issued in European Patent Application No. 13177792.2, (9 pages).
Hedayat, et al., "A Two-Way Active Measurement Protocol (TWAMP)," Oct. 2008, (24 pages).
Network Working Group, Traceroute Using an IP Option, G. Malkin, Xylogics, Inc., Jan. 1993, (7 pages).
Settey, "Advanced Quality Performance Monitoring with IP SLA," 2008, (88 pages).
Sun, L. et al. "Flow-Based Performance Measurement." Internet Engineering Task Force. Jun. 29, 2012, (15 pages).

* cited by examiner

FIG. 5

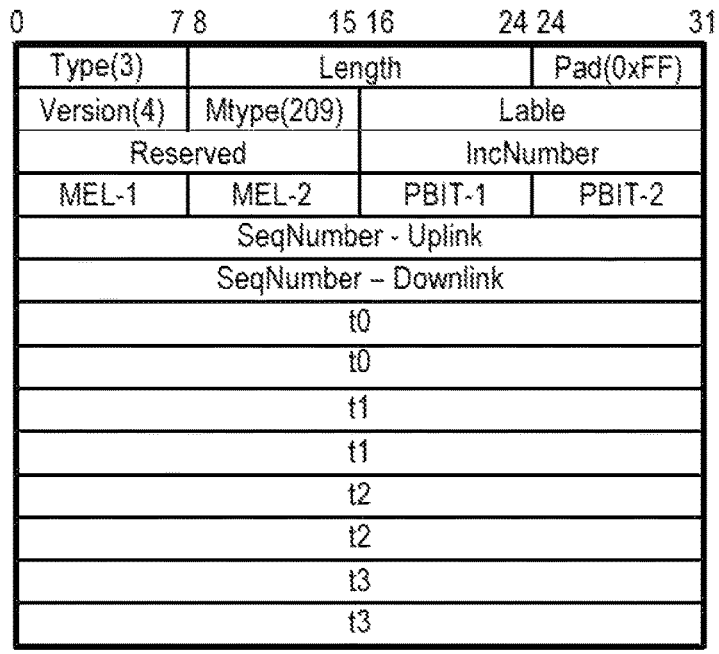

| Field | Size (bit) | Description |
|---|---|---|
| Type | 8 | Always set to 3, i.e. the type of TLV (3=data). |
| Length | 16 | Length of the data field in the Data TLV data |
| Pad | 8 | Always set to ff16. Use to align the STREAM header. |
| Version | 8 | STREAM version. Current version is 4 (first byte of STREAM header). |
| Mtype | 8 | STREAM Message Type. Set to 209. |
| Lable | 16 | Unique Label between pair (src/dst) of MAC addresses |
| Reserved | 16 | Reserved for future use. Must be set to zero (0). |
| SeqNumUL | 32 | Sequence number for uplink / forward path direction (Originator 100 to Reflector 102). |
| t0 | 64 | Originator 100 Transmit timestamp. Set by the Originator 100 upon transmission. |
| t3 | 64 | Originator 100 Receive timestamp. The Originator 100 sets this timestamp to zero upon transmission. This timestamp is set again by the Originator 100 upon reception of the reply from the Reflector 102. |

FIG. 6

| Field | Size (bit) | Description |
| --- | --- | --- |
| IncNum | 16 | Incarnation number. Assigned to the Reflector 102 when the reflector instance is setup and used in the reply sent back to the Originator 100. The Originator 100 must set the IncNum to zero upon transmission. |
| SeqNumDL | 32 | Sequence number for downlink / reverse path direction (Reflector 102 to Originator 100). The Originator 100 must set the SeqNumDL to zero upon transmission |
| MEL-1 | 8 | Reflector 102 received MEG Level (MEL). Must be set by the Reflector 102. The Originator 100 must set the MEL1 to ff16 upon transmission. |
| MEL-2 | 8 | Reflector 102 transmitted MEG Level (MEL). Must be set by the Reflector 102. The Originator 100 must set the MEL2 to ff16 upon transmission. |
| PBIT-1 | 8 | Reflector 102 received VLAN PBIT setting. Only valid and set by the Reflector 102 if the receive interface is a VLAN interface. The Originator 100 must set the PBIT1 to ff16 upon transmission. |
| PBIT-2 | 8 | Reflector 102 transmitted VLAN PBIT setting. Only valid and set by the Reflector 102 if the arrival (receive) interface is a VLAN interface. The Originator 100 must set the PBIT2 to ff16 upon transmission. |
| t1 | 64 | Reflector 102 Receive timestamp. The Originator 100 sets this timestamp to zero upon transmission. Format: seconds:ns |
| t2 | 64 | Reflector 102 Transmit timestamp. The Originator 100 sets this timestamp to zero upon transmission. Format: seconds:ns |

FIG. 7

AUTOMATIC SETUP OF REFLECTOR INSTANCES

CROSS REFERENCE TO RELATED APPLICATIONS

This application is a continuation of and claims priority to U.S. application Ser. No. 14/856,675, filed Sep. 17, 2015, now U.S. Pat. No. 9,419,883, which is a continuation of U.S. application Ser. No. 14/551,234, filed Nov. 24, 2014, now U.S. Pat. No. 9,166,900, which is a continuation of U.S. application Ser. No. 14/184,898, filed Feb. 20, 2014, now U.S. Pat. No. 8,923,132, which is a continuation of U.S. application Ser. No. 13/557,138, filed Jul. 24, 2012, now U.S. Pat. No. 8,711,708, each of which is hereby incorporated by reference herein in its entirety.

TECHNICAL FIELD

The present invention relates to automatic setup of a test session in the context of an Ethernet Operations Administration and Maintenance (OAM) framework.

BACKGROUND

For many years, Ethernet has been used as a LAN (Local Area Network) technology, and enterprises have managed these networks with the use of Internet protocols such as Simple Network Management Protocol (SNMP), ICMP Echo (or IP Ping), IP Traceroute, and Cisco Unidirectional Link Detection Protocol (UDLD). EOAM (Ethernet Operations Administration and Maintenance) is a protocol for installing, monitoring, and troubleshooting MANs (Metropolitan Area Network) and WANs (Wide Area network). The use of Ethernet as a networking technology has created the need for a new set of OAM protocols since there are now large and complex networks with a wide user base that involves different operators providing end-to-end services.

The IETF (Internet Engineering Task Force) develops and promotes Internet standards. The One-way Active Measurement Protocol [RFC4656] (OWAMP) provides a common protocol for measuring one-way metrics between network devices. OWAMP can be used bi-directionally to measure one-way metrics in both directions between two network elements. However, it does not accommodate round-trip or two-way measurements.

Two-Way Active Measurement Protocol (TWAMP) provides a standards-based method for measuring the round-trip IP performance (packet loss, delay and jitter) between two devices. TWAMP uses the methodology and architecture of One-Way Active Measurement Protocol (OWAMP) to define a way to measure two-way or round-trip metrics.

There are four logical entities in TWAMP: the Control-Client, the Session-Sender, the Server, and the Session-Reflector. The Control-Client and Session-Sender are typically implemented in one physical device (the "Client") and the Server and Session-Reflector in a second physical device (the "Server") with which the two-way measurements are being performed.

The Control-Client and Server establish a TCP (Transmission Control Protocol) connection and exchange TWAMP-Control messages over this connection. When the Control-Client wants to start testing, the Client communicates the test parameters to the Server. If the Server agrees to conduct the described tests, the test begins as soon as the Client sends a Start-Sessions message. As part of a test, the Session-Sender sends a stream of UDP-based (User Datagram Protocol) test packets to the Session-Reflector, and the Session-Reflector responds to each received packet with a response UDP-based test packet. When the Session-Sender receives the response packets from the Session-Reflector, the information is used to calculate two-way delay, packet loss, and packet delay variation between the two devices.

In TWAMP Light, (part of RFC 5357) the roles of Control-Client, Server, and Session-Sender are implemented in one host referred to as the Controller, and the role of Session-Reflector is implemented in another host referred to as the Responder.

TWAMP Light provides a simple architecture for Responders where their role is to simply act as light test points in the network. The Controller establishes the test session with the Server through non-standard means. After the session is established, the Controller transmits test packets to the Responder. The Responder follows the Session-Reflector behavior of TWAMP with the following exceptions.

In the case of TWAMP Light, the Session-Reflector does not necessarily have knowledge of the session state. If the Session-Reflector does not have knowledge of the session state, then the Session-Reflector must copy the Sequence Number of the received packet to the Sequence Number field of the reflected packet. The Controller receives the reflected test packets and collects two-way metrics. This architecture allows for collection of two-way metrics.

TWAMP Light eliminates the need for the TWAMP-Control protocol, and assumes that the Session-Reflector is configured and communicates its configuration with the Server through non-standard means. The Session-Reflector simply reflects the incoming packets back to the Controller while copying the necessary information and generating sequence number and timestamp values. TWAMP Light introduces some additional security considerations. The non-standard means to control the responder and establish test sessions offers the following features. The non-standard responder control protocol has an authenticated mode of operation. The responder is configurable to accept only authenticated control sessions. The non-standard responder control protocol has a means to activate the authenticated and encrypted modes of the TWAMP-Test protocol. When the TWAMP Light test sessions operate in authenticated or encrypted mode, the Session-Reflector must have some mechanism for generating keys (because the TWAMP-Control protocol normally plays a role in this process, but is not present here).

BRIEF SUMMARY

According to one aspect of the present invention, a method of establishing a service operations administration and maintenance (OAM) session between an originator and a reflector in a communication network includes continuously monitoring, by the reflector, any test packets transmitted by the originator. The originator transmits to the reflector, at a time indicated by a first timestamp, a test packet. The reflector receives the test packet at a time indicated by a second timestamp and generates a unique flow identifier that identifies the reflector. The reflector transmits the test packet to the originator. The reflector assigns a sequence number to the test packet. The originator receives the test packet at a time indicated by a fourth timestamp. The reflector stores the unique flow identifier at least for the duration of the OAM session.

According to a further aspect of the present invention, a method of establishing a service operations administration and maintenance (OAM) session between an originator and a reflector in a communication network, includes continuously monitoring, by the reflector, any test protocol data units transmitted by the originator. The reflector receives a test protocol data unit. The reflector generates a unique flow identifier which identifies the reflector. The reflector assigns a sequence number to the test protocol data unit relayed by the reflector. The reflector stores the unique flow identifier at least for the duration of the OAM session.

According to an additional aspect of the present invention, a system for establishing a service operations administration and maintenance (OAM) session between an originator and a reflector in a communication network includes an originator and a reflector. The originator is configured to generate a test protocol data unit and to transmit the test protocol data unit along a test path to a reflector. The reflector is configured to receive the test protocol data unit from the originator and to relay the test protocol data unit to the originator. The reflector is further configured to generate a unique flow identifier identifying the reflector and to store the unique flow identifier at least for the duration of the OAM session. The reflector is further configured to assign a sequence number to the test protocol data unit transmitted by the reflector. The originator is configured to receive the test protocol data unit from the reflector.

BRIEF DESCRIPTION OF THE DRAWINGS

The foregoing and other advantages of the present disclosure will become apparent upon reading the following detailed description and upon reference to the drawings.

FIG. 5 illustrates the format of the Stream Data;

FIG. 6 illustrates the encoding of the Stream Data generated by the Originator;

FIG. 7 illustrates the format and encoding of the Stream Data generated by the Reflector.

Figure 1:
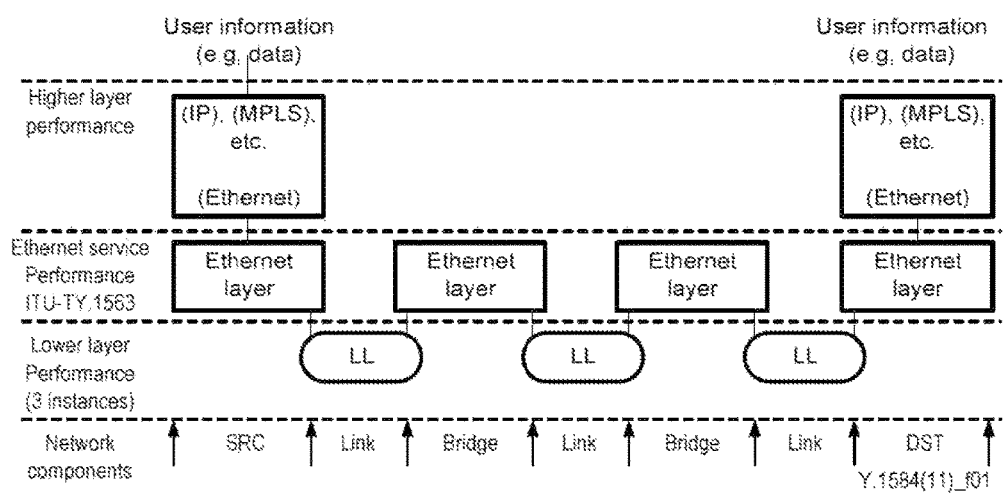
FIG. 1 illustrates the measurements needed to qualify an Ethernet circuit at installation.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION

In the following description, for purposes of explanation and not limitation, specific details are set forth, such as particular embodiments, procedures, techniques, etc. in order to provide a thorough understanding of the present invention. However, it will be apparent to those ordinarily skilled in the art that the present invention may be practiced in other embodiments that depart from these specific details.

The following discussion is intended to provide a brief, general description of suitable computer processing environments in which the methods and apparatus described herein may be implemented. In one non-limiting example, the method and apparatus will be described in the general context of processor-executable instructions, such as program modules, being executed in a distributed computing environment in which tasks may be performed by remote and local processing devices linked via one or more networks. Those of ordinary skill in the art will appreciate that the method may be practiced with any number of suitable computer system configurations and is not limited to the described configurations.

The Ethernet Service OAM framework is defined in standards such as ITU-T Y.1731 and IEEE 802.1ag. It allows efficient delay and packet loss measurements via a bi-directional measurement function, i.e., 2×OneWay, for switched Layer 2 networks, with the capability to measure and report all required metrics (delay, jitter, loss, reorder, etc.) for both directions (forward path and reverse path) to determine and report on the performance of the network.

Jitter is the difference in end-to-end one-way delay between selected packets in a flow, with any lost packets being ignored. The delay is specified from the start of the packet being transmitted at the source to the end of the packet being received at the destination. For instance, if the packets are transmitted every 20 ms, and if the 2nd packet is received 30 ms after the 1st packet, the jitter=−10 ms. If the 2nd packet is received 10 ms after the 1st packet, the jitter=+10 ms.

There is a need for the various performance measurements to operate either directly over a Layer 2 network or when the Ethernet Services are offered across a Layer 3 network infrastructure (IPv4 and/or IPv6).

The ITU (International Telecommunication Union) is the United Nations specialized agency for information and communication technologies (ICTs). ITU standards (called Recommendations) are fundamental to the operation of ICT networks. ITU-T Y.1731 performance monitoring provides standards-based Ethernet performance monitoring that encompasses the measurement of Ethernet frame delay, frame delay variation, and frame loss and throughput.

The Ethernet Service OAM framework defines a number of functions for connectivity verification as well as performance monitoring. One aspect of the present invention introduces enhancements to the basic Ethernet Service OAM messages defined by ITU Y.1731. For instance, Ethernet Loopback (ETH-LB) and two-way Frame Delay Measurement (ETH-DM) are bi-directional, i.e., the Originator node will send one or more measurement frames to a Reflector node, which sends the measurement frames back (after processing and swapping of MAC addresses, etc.) to the Originator node. Both ETH-DM and ETH-LB lack the ability to monitor one-way packet loss, reorder, and duplicate packets, since these two measurement functions do not provide a dedicated sequence number for downlink (reverse path) direction as per Y.1731.

This is one of the reasons why there is a need for a proprietary ETH-VSP measurement function. The measurements obtained via the 2×OneWay method are very similar to those obtained via TWAMP, with the difference being that the 2×OneWay reflector records the IP-ToS (Type of Service) in the received packet.

ETH-DM and ETH-LB do not require any Reflector instances to operate according to specification since there is no explicit tracking of sequence numbers for these tests, while both ETH-VSP and ETH-SLM require such an instance. ETH-SLM is the new measurement function in Y.1731, and it requires a dedicated sequence number counter.

To summarize the measurement functions in Y.1731: ETH-LB: measures and reports two-way delay, jitter, packet loss, reorder, etc. In order to improve the measures available from an ETH-LB message, a Data TLV (Type-Length-Value) is added to the payload of the ETH-LBM to hold the transmit timestamp (t0). Since no "active" action is needed, no formal need for an explicit Reflector instance is required. All that is required is to configure the network element hosting the Reflector to enable this functionality. ETH-DM: measures and reports two-way delay, jitter, packet loss, reorder, etc. It can also measure and report one-way delay and jitter if the two optional timestamps (t1 and t2) are used by the Reflector. A Data TLV (Type-Length-Value) is added to ETH-DMM payload to hold "uplink" sequence number. ETH-SLM: measures and reports two-way delay, jitter, packet loss, reorder, etc. It will also measure and report one-way packet loss, reorder, etc. Since the Reflector needs to track the sequence numbers, support for the ETH-SLM message requires configuration where at least a MEP must be configured. ETH-VSP: measures and reports all metrics, both two-way and one-way. ETH-VSP has no dependencies to MEPs or MIPs, but it may be required to enable Ethernet OAM to enable the ETH-VSP Reflector depending on the specific implementation. In summary, the combination of 2×OneWay and TWAMP provide the same functionality as ETH-VSP when it comes to measured and reported metrics, i.e., delay, jitter, packet loss, reorder, etc.

The following diagrams are used to illustrate the need for delay and other measurements needed to qualify an Ethernet circuit at installation. FIG. 1, taken from ITU Y.1563, illustrates the layered nature of the performance of the Ethernet service. This network is comprised of connection-oriented or connectionless links that are connected to bridges that process the Ethernet Layer inside the network. Each time an Ethernet frame is going through an Ethernet layer, it is processed for integrity and sent to the next bridge through a Lower Layer connection. Lower Layers are based on multiple technologies, such as, SDH, OTN, PDH, MPLS, ATM and ETY. The performance of all Ethernet Layers and Lower Layers impact the end-to-end performance of the network used to deliver services.

Higher layers may be used to enable end-to-end communications. Upper layers may include protocols like IP, MPLS and Ethernet that allow a greater scalability for network deployment. Other protocols, like TCP, provide the capability to re-transmit frames should a frame loss occur. Unfortunately, two of the drawbacks of TCP are added delay in the transmission of user information, and the possible limitation of maximum advertised window size and interaction with the bandwidth-delay product and flow control interaction with loss and delay of the Ethernet Service. One aspect of the present invention is directed to performing the requested measurement independently from the fact that the links (or Lower Layer—LL) used to carry the Ethernet Virtual Circuits (EVC) may operate at Layer 2 or Layer 3.

Figure 2:
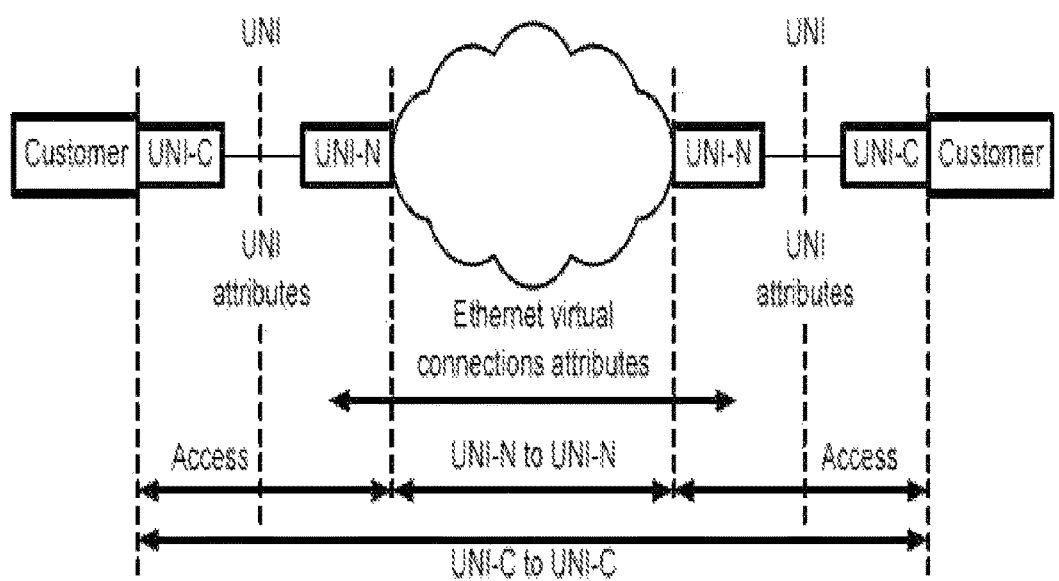
FIG. 2 illustrates Ethernet service areas.

FIG. 2, taken from ITU Y.1564, provides a simple example of Ethernet service areas and is referred to as an Ethernet service activation measurement. The goal of the test is to verify the configuration and performance of Ethernet-based services. The test verifies Ethernet Service Attributes including Committed Information Rate (CIR), Excess Information Rate (EIR) and other attributes. This shows the different portions of a network that support an Ethernet service instance.

It is further shown that the UNI reference point occurs in the middle of the access link, or more precisely that the UNI is a reference point whose functionality is split into customer (UNI-C) and network (UNI-N) components. From a service provider's perspective, they need to deliver services from UNI-C to UNI-C, and it is from this perspective that the test methodology described in the present invention was created.

The customer equipment (CE) and the operator's network exchange service frames across the UNI. A service frame is an Ethernet frame transmitted across the UNI toward the Service Provider (called an ingress service frame) or across the UNI towards the CE (called an egress service frame). Many services run on both UNIs. They are qualified by their attributes. The attributes include, but are not limited to, connection type; traffic parameters: QoS (including VLAN information), traffic type (data vs. management), etc.; bandwidth profile; performance criteria: FD, FDV, Frame Loss ratio, availability, etc.

Accordingly, an Ethernet Virtual Circuit may actually span multiple transport networks at Layer 2 or Layer 3. This creates challenges to efficiently measure delays and packet loss with traditional methods.

Figure 3:
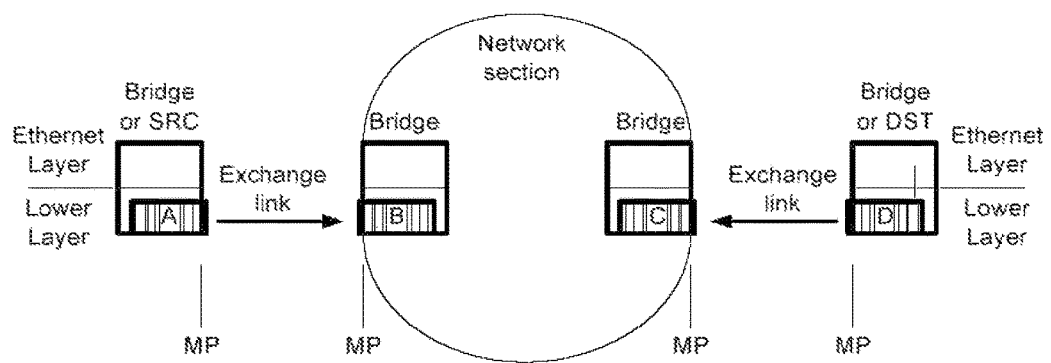
FIG. 3 illustrates how Measurement Points (MP) are typically found at the boundaries between different Lower Layers used to support the Ethernet Virtual Circuits (EVC)

FIG. 3, taken from ITU-T y.1563, illustrates how Measurement Points (MP) are typically found at the boundaries between different Lower Layers used to support the EVC. The positioning of these MPs (or Reflectors) is critical to obtain adequate measurements. As per the above diagram, a 2-way delay measurement is typically taken from the SRC to the DST and back to the SRC and does not provide detailed delay information for each Exchange Link (or Lower Layer).

A Reflector instance is of type unmanaged or managed. An unmanaged Reflector instance is allocated from a Reflector instance pool and activated in run-time when a new measurement stream arrives. A unique flow identifier (FlowId), is generated for the specific measurement stream and this identifier is then used to associated the measurement stream with the allocated Reflector instance. The Reflector instance will, if no message has been received from the associated measurement stream within the duration of a timeout timer, be deactivated, drop its association with the measurement stream and be given back to reflector instance pool.

A managed Reflector instance is configured, through a control interface, to be associated with a specific measurement stream identified by a unique flow identifier (FlowId). The Reflector instance is, in this case, pre-allocated for the specific measurement stream and no resource allocation is required in runtime. A managed Reflector instance is de-activated and given back to the Reflector instance pool by removing the configuration for the reflector instance through the control interface.

According to one aspect of the present invention, unmanaged reflectors are setup automatically, thus eliminating (or at least significantly reducing) the overhead associated with the definition and on-going management of configuration data for each Reflector and to eliminate the need for an explicit OAM Session establishment protocol between the Originator and a Reflector. Such automatic setup could be desirable not only during the initial activation of an Ethernet Circuit, but also at any time during the life of an Ethernet Circuit when it has been declared Operational.

A protocol data unit (PDU) is best understood in relation to a service data unit (SDU). The features or services of the network are implemented in distinct "layers." For example, sending ones and zeros across a wire, fiber, etc. is done by the physical layer. Organizing the ones and zeros into chunks of data and getting them safely to the right place on the wire is done by the data link layer. Passing data chunks over multiple connected networks is done by the network layer. Delivery of the data to the right software application at the destination is done by the transport layer. Between the layers (and between the application and the top-most layer), the layers pass service data units across the interfaces. The application or higher layer understands the structure of the data in the SDU, but the lower layer at the interface does not; it treats the data in the SDU as payload, undertaking to get it to the same interface at the destination. In order to do this, the protocol layer adds to the SDU certain data it needs to perform its function. For example, the higher layer might add a port number to identify the application, a network address to help with routing and/or a code to identify the type of data in the packet and error-checking information.

All this additional information, plus the original service data unit from the higher layer, constitutes the protocol data unit at this layer. The significance of this is that the PDU is the structured information that is passed to a matching protocol layer further along on the data's journey that allows the layer to deliver its intended function or service. The matching layer, or "peer," decodes the data to extract the original service data unit, decide if it is error-free and where to send it next, etc. Unless the data has already arrived at the lowest (physical) layer, the PDU is passed to the peer using services of the next lower layer in the protocol "stack." When the PDU passes over the interface from the layer that constructed it to the layer that merely delivers it (and therefore does not understand its internal structure), it becomes a service data unit to that layer. The addition of addressing and control information (which is called encapsulation) to an SDU to form a PDU, and the passing of that PDU to the next lower layer as an SDU repeats until the lowest layer is reached and the data passes over some medium as a physical signal.

PDUs are relevant in relation to each of the first 4 layers of the OSI model as follows:
1. The Layer 1 (Physical Layer) PDU is the bits.
2. The Layer 2 (Data Link Layer) PDU is the frame.
3. The Layer 3 (Network Layer) PDU is the packet.
4. The Layer 4 (Transport Layer) PDU is the segment for TCP connections or datagram for UDP connections.

Upon the installation and activation of an Ethernet circuit, there is a need to be able to obtain precise performance measurements to make sure the EVC (Ethernet Virtual Connection) is fully functional in accordance with the performance specification of the operator.

It is also highly desirable to be able to perform similar performance measurements (1) over the life of the Ethernet Circuit (24 hours a day, 7 days a week) to ensure the on-going quality of operation and adherence to any Service Level Agreement (SLA) and other operational parameters, and (2) while the Ethernet circuit is in service.

According one aspect of the present invention, the initiator of a 2-way delay measurement is called an Originator 100 and a Reflector Instance 102 responds to the 2-way delay measurement requests.

Figure 4:
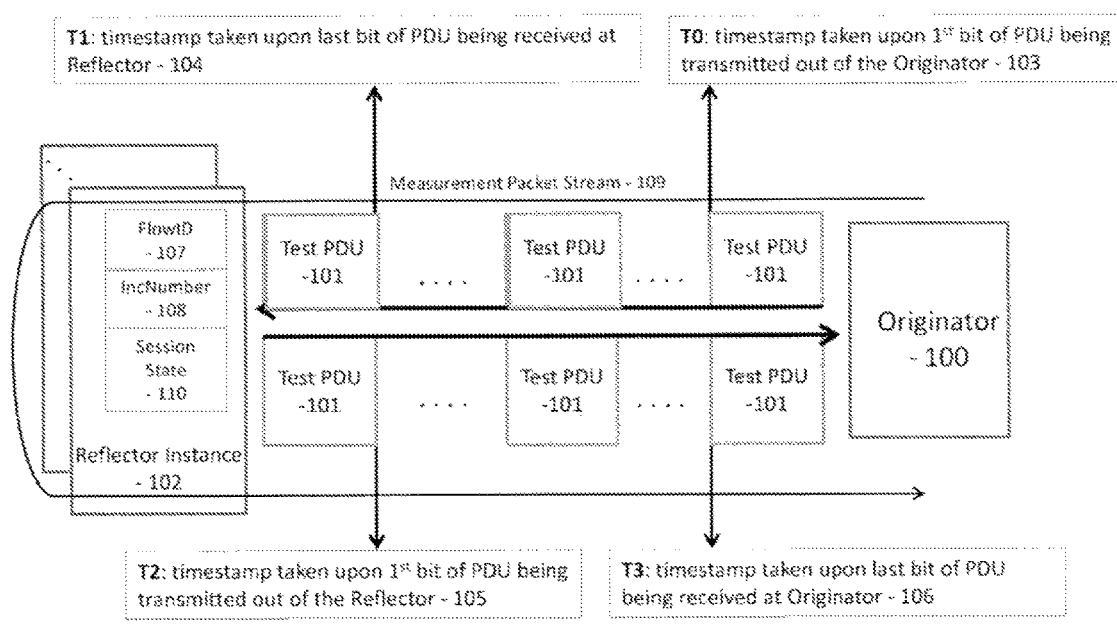
FIG. 4 is a diagram illustrating where the timestamps are generated for 2-way loopback measurement and the make-up of the Reflector Instance.

FIG. 4 is a diagram of a 2-way loopback measurement. The setup of such a Service OAM session between an Originator 100 and a Reflector Instance 102 traditionally requires extensive configuration and/or a setup exchange between the Originator 100 and the Reflector Instance 102 to negotiate a unique (per-session) Flow Identifier before a measurement test can take place. One aspect of the present invention relates to an automated setup of the unique FlowID 107 without the need for an explicit negotiation or a preliminary configuration step.

A 2-way measurement test is initiated by an Originator 100 sending to a Reflector Instance 102 a Test PDU 101.

One aspect of the present invention relates to a bi-directional solution that can operate over any Layer 2 or Layer 3 network with the capability to measure and report metrics for both directions. A Reflector Instance 102 is required if the measurement protocol incorporates a dedicated sequence number for reverse path direction. The main purpose of the Reflector Instance 102 is to provide a dedicated sequence number counter to a unique associated Measurement Packet Stream 109 (or flow). The sequence number counter is used to assign sequence numbers to the "reflected" packets. The associated Measurement Packet Stream 109 is uniquely identified by its FlowID 107, and it is required that this FlowID 107 be stored by the Reflector Instance 102 serving the particular Measurement Packet Stream 109.

Whenever a Service OAM session is to be established between an Originator 100 and a Reflector Instance 102, it requires the ability to preserve state information about the session; the FlowID 107 is used to do this. A Reflector Instance 102 implements the functionality to provide a stateful entity or Session State 110 used to serve a Measurement Packet Stream 109. This Session State 110 holds a unique sequence number counter, expiration timer, etc., for its associated Measurement Packet Stream 109.

On receipt of the Test PDU 101, the Reflector Instance 102 generates a unique FlowID (Flow Identifier) 107 which identifies the Reflector Instance 102. The Flow ID 107 may be of any size and may be automatically defined independently of whether the Service OAM session operates over a Layer 2 or Layer 3 network.

Such a FlowID 107 can be set via different methods, including, but not limited to, via a signaling exchange (for instance using the TWAMP control plane); via configuration methods (CLI, Web-based configuration, XML, etc.) or automatically by the Reflector 102.

In order to eliminate the complexity of the configuration process and of a Service OAM session handshake, the FlowID 107 can be automatically determined by the Reflector Instance 102, without the need for an explicit negotiation with the Originator 100, as follows:

a) When the communication between the Originator 100 and the Reflector 102 occurs over a Layer 2 network, a unique FlowID 107 is generated/created using a pair of MAC addresses, where the source MAC address belongs to the Originator 100:

FlowId=MacSrcAddress+StreamLabel[+DstMacAddress]

b) When an OAM protocol supports the notion of a unique identifier, it can be used to derive a unique FlowID 107. For instance, the ITU Y.1731 standard defines an Ethernet Synthetic Loss Measurement (ETH-SLM) PDU that includes a 4-octet Test Identifier (TestID). When such an identifier is present, the FlowID 107 is as follows:

FlowId=MacSrcAddress+TestID+[MacDstAddress+SrcMepId]

c) Alternatively, a FlowID 107 can be used to include additional fields such as the destination MAC address and the VLAN [6] identifier (VlanID) if VLAN interfaces are in use, as follows:

FlowId=MacSrcAddress+StreamLabel+MacDstAddress+VLAN Id d) A unique FlowID 107 can be obtained when operating over a Layer 3 IPv4 network, as follows:

FlowId=IPv4SrcAddress+Source UDP Port+StreamLabel

Or

FlowId=IPv4SrcAddress+Source UDP Port+
[IPv4DstAddress+Dest UDP Port]+StreamLabel e) A unique FlowID 107 can be obtained when operating over a Layer 3 IPv6 network as follows:

FlowId=IPv6SrcAddress+Source UDP Port+StreamLabel

Or

FlowId=IPv6SrcAddress+Source UDP Port+
[IPv6DstAddress+Dest UDP Port]+StreamLabel The above FlowID 107 is of variable length. An implementation may add bit-padding at the end of the FlowID 107 to obtain a specific number of bits (for instance 64 or 128 bits total) independently of which elements are used to build it.

The Originator 100 is required to keep track of the assigned stream labels (if used) for a specific interface.

The ITU Y.1731 protocol is extensible via the concept of vendor specific OAM-PDU called (ETH-VSP). A Stream Data TLV (Type-Length-Value) is added to the ETH-VSP encoding to carry the 2-way measurement test in the illustrated embodiment. The timestamps (T0 to T3) use the timestamp format defined in IEEE 1588-2004. The STREAM Data TLV (Type-Length-Value) for ETH-VSP has been assigned MType=209.

When an Originator 100 transmits a Test PDU 101, a timestamp T0 is taken at the beginning of the Test PDU 101. When the Reflector Instance 102 receives the Test PDU 101, it takes timestamp T1 at the end of the Test PDU 101. Timestamp T2 is taken by the Reflector Instance 102 at the beginning of the Test PDU 101 being transmitted back to the Originator 100. Timestamp T3 is taken by the Originator 100 when it receives the end of the Test PDU 101 transmitted by the Reflector Instance 102.

FIG. 5 shows the format of the stream data that is used by the Originator 100 and the Reflector Instance 102.

FIG. 6 shows the Stream Data TLV (Type-Length-Value) encoding generated by the Originator 100.

FIG. 7 shows the Stream Data TLV (Type-Length-Value) encoding when used by the Reflector Instance 102 in reply to a Test PDU 101 received from the Originator 100. Since the Reflector Instance 102 is automatically set up, a timeout mechanism is implemented to tear down the Reflector Instance 102 and free associated resources whenever Test PDUs 101 are not received from the Originator 100 (identified by a unique FlowID 107) for a pre-determined period of time (typically in the order of 10 seconds). Should new Test PDUs 101 be received from the same Originator 100 after the expiration of the idle timer, the Reflector Instance 102 will automatically generate a new unique FlowID 107. A complementary tag is therefore required to indicate to the Originator 100 that a new Reflector Instance 102 has been automatically set up. This is achieved by an Incarnation Number (IncNum 400) in the Stream Data TLV (Type-Length-Value) returned by the Reflector Instance 102 to the Originator 100.

According to one aspect of the present disclosure, it is possible to automatically detect whether the Reflector Instance 102 has been re-started or not and therefore whether important state information regarding a Service OAM Session has potentially been lost.

One method to detect such a restart condition is to assign a unique Incarnation Number to each Reflector Instance 102. The incarnation number (IncNum 400) is an unsigned integer value generated from a global incarnation counter, which increases by one (1) each time a new incarnation number is allocated:

IncNum=IncNumCnt;

IncNumCount=IncNumCnt+1.

The above is implemented as an automatic operation to ensure the incarnation number counter is increased at the same moment as a new IncNum 400 is assigned to the Reflector Instance 102.

The global incarnation number counter is initialized once to a random number at system startup to minimize the probability of reusing the same IncNum 400 for a Reflector Instance 102 after a system restart. The wrap-around rate of the global incarnation counter depends on the arrival rate of new measurement streams and the re-activation rate of already running measurement streams.

According to a further aspect of the present invention, a Reflector Instance 102 compares a newly generated IncNum 400 with an older or previous IncNum 400, and if the two values are equal, the Reflector Instance 102 generates a new IncNum 400 to avoid assigning the same IncNum 400 to the Reflector Instance 102 serving one and the same Measurement Packet Stream 109.

An alternative to assigning an IncNum 400 is to rely on the Originator 100 to detect a Restart of a Reflector Instance 102 by analyzing the next Test PDU 101 (including but not limited to: ETH-VSP, EYH-SLM, TWAMP and other PDU which essentially include the same information) returned by the Reflector Instance 102 for an OAM Session. OAM PDUs are IEEE 802.3 slow protocol frames containing OAM control and status information used to monitor, test, and troubleshoot links. The way for an Originator 100 to detect a Reflector Instance 102 restart is to look at the timestamps (T0-T3) and Sequence Number (401) of the received packets (ETH-VSP). A Reflector Instance 102 restart can be determined when a longer packet loss period occurs and the "downlink" Sequence Number 401 of the next ETH-VSP reply is much lower than the expected sequence number, and the gap (in the "uplink" Sequence Numbers 300) divided by the packet data rate is large enough to reject a simple packet reordering condition.

According to a further aspect of the present invention, the Originator 100 detects a restart of the Reflector Instance 102 by examining the timestamps T0 and T1 timestamps in the returned ETH-VSP response. A very large gap between the timestamps T0 and T1, even when taking into account possible reordering of the test packets and the transmission rate of these packets will be indicative of a restart of a Reflector Instance 102 or an adjustment/reset of the Reflector Instance 102 clock.

Yet another method is the reception (by an Originator 100) of an ETH-VSP response with an out-of-order Downlink Sequence Number 400 after a long loss period that is out of the scope of a valid out-of-order ETH-VSP response packet.

In the case of a Reflector Instance 102 restart at the beginning of a Service OAM session (where the Restart takes place fast enough to occur before a long packet loss timeout is triggered), the Originator 100 can detect the restart condition by detecting that the Downlink Sequence Number 400 in the ETH-VSP response has been used before with an earlier (older) timestamp T0 than the ETH-VSP just received. This method requires that the Originator 100 keeps track of the timestamp T0 and Downlink Sequence Number 400 of previously issued test packets for the last "n" test packets that fit inside an acceptable range of re-ordering of test packets. The range "n" of acceptable range of re-ordering may be defined as part of an SLA profile or via other configuration element.

The embodiment described is applicable to software-based, HW-based and pluggable (FPGA) Originators and Reflectors.

The present invention includes systems having processors to provide various functionality to process information, and to determine results based on inputs. Generally, the processing may be achieved with a combination of hardware and software elements. The hardware aspects may include combinations of operatively coupled hardware components including microprocessors, logical circuitry, communication/networking ports, digital filters, memory, or logical circuitry. The processors may be adapted to perform operations specified by a computer-executable code, which may be stored on a computer readable medium.

The steps of the methods described herein may be achieved via an appropriate programmable processing device, such as an external conventional computer or an on-board field programmable gate array (FPGA) or digital signal processor (DSP), that executes software, or stored instructions. In general, physical processors and/or machines employed by embodiments of the present invention for any processing or evaluation may include one or more networked or non-networked general purpose computer systems, microprocessors, field programmable gate arrays (FPGA's), digital signal processors (DSP's), microcontrollers, and the like, programmed according to the teachings of the exemplary embodiments of the present invention, as is appreciated by those skilled in the computer and software arts. Appropriate software can be readily prepared by programmers of ordinary skill based on the teachings of the exemplary embodiments, as is appreciated by those skilled in the software arts. In addition, the devices and subsystems of the exemplary embodiments can be implemented by the preparation of application-specific integrated circuits or by interconnecting an appropriate network of conventional component circuits, as is appreciated by those skilled in the electrical arts. Thus, the exemplary embodiments are not limited to any specific combination of hardware circuitry and/or software.

Stored on any one or on a combination of computer readable media, the exemplary embodiments of the present invention may include software for controlling the devices and subsystems of the exemplary embodiments, for driving the devices and subsystems of the exemplary embodiments, for processing data and signals, for enabling the devices and subsystems of the exemplary embodiments to interact with a human user, and the like. Such software can include, but is not limited to, device drivers, firmware, operating systems, development tools, applications software, and the like. Such computer readable media further can include the computer program product of an embodiment of the present invention for performing all or a portion (if processing is distributed) of the processing performed in implementations. Computer code devices of the exemplary embodiments of the present invention can include any suitable interpretable or executable code mechanism, including but not limited to scripts, interpretable programs, dynamic link libraries (DLLs), Java classes and applets, complete executable programs, and the like. Moreover, parts of the processing of the exemplary embodiments of the present invention can be distributed for better performance, reliability, cost, and the like.

Common forms of computer-readable media may include, for example, a floppy disk, a flexible disk, hard disk, magnetic tape, any other suitable magnetic medium, a CD-ROM, CDRW, DVD, any other suitable optical medium, punch cards, paper tape, optical mark sheets, any other suitable physical medium with patterns of holes or other optically recognizable indicia, a RAM, a PROM, an EPROM, a FLASH-EPROM, any other suitable memory chip or cartridge, a carrier wave or any other suitable medium from which a computer can read.

While particular implementations and applications of the present disclosure have been illustrated and described, it is to be understood that the present disclosure is not limited to the precise construction and compositions disclosed herein and that various modifications, changes, and variations can be apparent from the foregoing descriptions without departing from the spirit and scope of the invention as defined in the appended claims.

What is claimed is:

1. A method of performing a bi-directional test measurement in a network, the method comprising:
   receiving a test packet by an unmanaged reflector, the test packet transmitted by an originator, the test packet used to implement the test measurement;
   the reflector generating a state session, the state session storing the state of the test measurement; and
   transmitting the test packet from the reflector to the originator.

2. The method of claim 1 further comprising the reflector assigning a sequence number to the test packet.

3. The method of claim 1 further comprising the reflector assigning a unique flow identifier which identifies the reflector.

4. The method of claim 1 wherein the network is a VLAN.

5. The method of claim 1 wherein the test measurement verifies layer 2 performance.

6. The method of claim 1 wherein the test measurement verifies layer 3 performance.

7. A method of performing a bi-directional test measurement in a network, the method comprising:
   receiving a test packet by an unmanaged reflector, the test packet transmitted by an originator, the test packet used to implement the test measurement;
   the reflector generating a state session comprising a unique sequence number counter and an expiration timer, the state session storing the state of the test measurement; and
   transmitting the test packet from the reflector to the originator.

* * * * *